(12) United States Patent
Eckl et al.

(10) Patent No.: US 7,370,465 B2
(45) Date of Patent: May 13, 2008

(54) COVER FOR AN ENERGY CONVEYING CHAIN, IN ADDITION TO CHAIN LINK AND ENERGY CONVEYING CHAIN

(75) Inventors: Erwin Eckl, Siegen (DE); Heiner Samen, Marienheide (DE); Herbert Wehler, Neunkirchen (DE)

(73) Assignee: Kabelschlepp GmbH, Siegen (DE)

( * ) Notice: Subject to any disclaimer, the term of this patent is extended or adjusted under 35 U.S.C. 154(b) by 0 days.

(21) Appl. No.: 10/568,839

(22) PCT Filed: Aug. 6, 2004

(86) PCT No.: PCT/EP2004/008810

§ 371 (c)(1),
(2), (4) Date: Sep. 7, 2006

(87) PCT Pub. No.: WO2005/021997

PCT Pub. Date: Mar. 10, 2005

(65) Prior Publication Data

US 2007/0032140 A1  Feb. 8, 2007

(30) Foreign Application Priority Data

Aug. 21, 2003  (DE) ................... 103 38 358

(51) Int. Cl.
*F16G 13/16*  (2006.01)
(52) U.S. Cl. .................. 59/78.1; 59/900; 248/49; 248/51
(58) Field of Classification Search ............ 59/78.1, 59/900; 248/49, 51
See application file for complete search history.

(56) References Cited

U.S. PATENT DOCUMENTS

| | | | | |
|---|---|---|---|---|
| 3,330,105 A | * | 7/1967 | Weber | 59/78.1 |
| 4,104,871 A | * | 8/1978 | Moritz | 59/78.1 |
| 4,392,344 A | * | 7/1983 | Gordon et al. | 59/78.1 |
| 4,669,507 A | * | 6/1987 | Moritz | 59/78.1 |
| 4,672,805 A | * | 6/1987 | Moritz | 59/78.1 |
| 5,836,148 A | * | 11/1998 | Fukao | 59/78.1 |
| 6,107,565 A | * | 8/2000 | O'Rourke | 59/78.1 |
| 6,387,002 B1 | * | 5/2002 | Gunter | 59/78.1 |
| 6,423,901 B2 | | 7/2002 | Richter | |
| 6,516,602 B2 | * | 2/2003 | Sakai et al. | 59/78.1 |
| 6,787,702 B2 | * | 9/2004 | Suzuki | 59/78.1 |
| 6,945,027 B2 | * | 9/2005 | Blase | 59/78.1 |

FOREIGN PATENT DOCUMENTS

| | | | |
|---|---|---|---|
| EP | 0 192 853 | | 9/1986 |
| EP | 0 286 442 | | 10/1988 |
| EP | 0 288 442 | | 10/1988 |
| EP | 1099894 | * | 11/1999 |
| EP | 1 099 894 | | 5/2001 |
| EP | 1378400 | * | 6/2003 |
| WO | WO 00/13277 | | 3/2000 |

* cited by examiner

Primary Examiner—David B Jones
(74) Attorney, Agent, or Firm—Smith Law Office

(57) ABSTRACT

The Invention relates to a cover (1) for an energy conveying chain. The cover (1) has a first end region (2) and a second end region (3) with at least one elastic section (4) positioned between the first (1) and second (2) end regions. The elastic section (4) is made in such a way that the ratio of a theoretical length modification of the cover (1) to an actual length modification of the cover is less than 1.

31 Claims, 8 Drawing Sheets

COVER FOR AN ENERGY CONVEYING CHAIN, IN ADDITION TO CHAIN LINK AND ENERGY CONVEYING CHAIN

FIELD AND BACKGROUND OF THE INVENTION

The object of the invention refers to a covering for an energy guide chain, a chain link of an energy guide chain, as well as to an energy guide chain.

Wiring guide units for active guiding of lines, cables or similar with a first end, which are arranged fixed locally, and with a second end, which is movable, are known in numerous embodiments.

The classical wiring guide unit, which is also called energy guide chain, or briefly, energy chain, consists of a number of individual chain links connected to one another by linking. The chain links have separated side mounting links, which are connected to one another through traverse links. The mounting links and the transverse links of the individual chain links, define a common guide channel of the energy guide chain in which lines, cables or similar can be arranged.

SUMMARY OF THE INVENTION

A wiring guide unit is known from WO 00/13277 for the guidance of at least one line. The line guide unit has two essentially parallel strands made of plastic. Each strand is subdivided by transverse separators into a strand with segments. These transverse separators run perpendicularly to the longitudinal direction of the strand and are formed at selected distances from one another. They extend in the side wall region to the proximity of a carrying wall region. The opposing segments are connected by links at selected distances to one another. The segments and the links delineate a guide channel for guiding at least one line.

In the known energy guide chains, there is a possibility that parts may fall into the guide channel during the operation of the energy guide chain. As a result of this, destruction or damage of the lines or cables, guided in the energy guide channel, may occur. The energy guide channel itself can become damaged.

In environments in which there is high occurrence of dirt, for example, in the form of dust or shavings, as a result of the deposition of dust in the energy guide chain, again, damage may occur to the tubular lines or similar in the energy guide channel.

Therefore, for example, it has been proposed in EP 0 192 853 A2 that the energy guide chain have a flexible covering band, at least on one side, which would span a U-shaped receiving part of a chain link in a cantilevered manner. For this purpose, at the free ends of the mounting links, holding elements protruding toward the inside are provided. The flexible cover band is pulled in between the holding elements. The holding elements consist of protrusions having a slit into which the cover band engages. The cover band extends over the entire length of the energy guide chain.

An energy guide chain is known from EP 0 288 442 A1, which consists of individual chain links. The chain links are formed by side mounting links, which are connected to one another by the cover. In this case, the cover is designed so that the sections form box-like recesses. The chain links near the cover overlap partially. They have curved surfaces, so that the chain links can be angled with respect to one another in the transition region between an upper trunk and the lower trunk.

Modular systems have been developed to reduce the manufacturing costs of the energy guide chains. Thus, for example, it is known that standardized transverse links can be used for forming the energy guide chains where the mounting links of the chain links can have a different shape or dimension. Thus, a standardized transverse link can be used for energy guide chains with different radii of curvature. The radius of curvature describes the transition region between an upper trunk and a lower trunk. Such a standardization cannot be used for an energy guide chain, as described, for example, in EP 0 286 442 A1, since the curved surfaces of the cover are adapted to the radius of curvature.

Based on this, the task of the present invention is to further develop a cover for an energy guide chain in such a way that this can be used for different energy guide chains. Especially, the application of a cover to energy guide chains with different radii of curvature should be made possible.

The cover according to the invention for an energy guide chain has a first end region and a second end region. There is at least one elastic section provided between the first and second end regions. The elastic section is designed so that the following relationship applies to it:

$$\Delta L/S < 1.$$

$\Delta L$ describes the length change of a cover with a length $L_0$ according to Hooke's law. Here, the length change $\Delta L$ is directly proportional to the modulus of elasticity of the material from which the cover is made. The actual length change of the cover corresponds to a section S, in which the geometrical length change of the cover is considered. Additionally to the geometrical length change of the cover, a length change can also occur due to the elastic behavior of the cover.

Through these measures, a cover is provided which can be used for energy guide chains with different radii of curvature. Moreover, the cover according to the invention permits compensation for possible tolerances resulting from manufacturing technology.

The elastic section of the cover according to the invention can have a Z-shape in the simplest case. As a result of action of tensional forces on the covering, the section may also become stretched, where a geometrical stretching due to the increase of the inner angle of the Z-shaped form of the section is superimposed on the stretching of the section, caused by a length change $\Delta L$ due to elongation.

Preferably, the cover according to the invention is designed so that at least one section has a wavy shape. The section may consist of a half wave or of a multiplicity of half waves. The wave-like section can also be formed from a full wave or from a multiplicity of full waves. The design of the wave-like section is preferably adapted to the energy guide chain for which the cover is to be used. There is also a possibility of the cover being adapted to several different energy guide chains.

The waves of the at least one section can have the same height or amplitude. This is advantageous for the manufacture of a cover. In order to increase the number of variations of the cover, in another advantageous embodiment of the cover, it is proposed that the at least one section have waves which have different heights. As a result of this, covers can be produced, the deformation of which can be produced as a function of the occurring tensional or compressive forces.

The wave-like design of the section can be done so that the repetition of the waves, that is, the periodicity of the waves, is the same. However, depending on the purpose of application, it may be advantageous when at least one section has waves with a different periodicity.

According to still another advantageous embodiment of the cover, it is proposed that the flanks of the waves of the at least one section have different slopes.

According to still another advantageous further development of the cover, it is proposed that the wave troughs and/or wave crests of the at least one section have different curvatures. As a result of this measure, uniform bending within the wave troughs or wave crests can be achieved when the cover is in the curving region of the energy guide chain. Considering the fact that, in the curving region of an energy guide chain, the curving increases towards the outside, it is advantageous when the length change of the cover in the outer region of the cover is greater than in the inner region of the cover.

The section of the cover can be designed so that the section has essentially a constant thickness in cross-section. A design is preferred in which the crests of the waves and/or of the waves of the flanks of the waves are different cross-sections. Especially, it is proposed that the wave crests and/or wave have a lower thickness in comparison to the flanks. In such a design of the wave-like section of the cover, it is achieved that, during transition and in the curving region, even of the energy guide chains, first the wave crests and/or wave are bent before a possible elongation-caused change in the flanks occurs.

In order to avoid high stress due to bending, especially in the wave crests and wave, or to reduce the danger of fatigue of the material, it is proposed that it is provided at least partly with a microstructure. Local reinforcement can be achieved by the microstructure which imparts an increased stability to the cover.

According to yet another advantageous embodiment of the cover, it is proposed that at least one section have at least two regions where the regions are designed differently. For example, these regions can be a primary and a secondary region. The primary region can be designed so that it becomes active when the curving region of an energy guide chain occurs within a first field. For example, if the curving region is outside the first field, then the secondary region becomes active when the cover is used for a corresponding energy guide chain. In this sense, the covering can be designed as a modular covering. The individual modules are produced by sections which are activated as a function of the radius of curvature of the energy guide chain. Optionally, the possibility exists to rigidly couple or fix individual sections, so that these sections do not become active.

According to yet another advantageous embodiment of the cover, it is proposed that it be formed by at least two cover parts, which partially overlap. The cover parts are linked through at least one plate, running essentially transversely to the longitudinal direction of the cover. Several plates can also be provided where a design is preferred in which the plates run essentially parallel to one another. However, the plates can also be designed parallel and inclined. Especially, it is proposed that at least one lamella have spring-elasticity. The at least one lamella according to another further advantageous embodiment can also be formed in a wavy manner, at least partly.

The first and/or the second end region is/are preferably designed so that these are suitable for positive and/or nonpositive locking to a transverse link of a chain link. The joining of the cover to a transverse link is preferably designed as a separable joint. A design is preferred here in which at least one end region and one transverse link are designed so that preferably no additional means are necessary to make the joint.

In order to reduce the parts from which an energy guide chain or a chain link is constructed, according to a still further advantageous embodiment of the cover according to the invention, it is proposed that the first and/or the second end region be designed as transverse link or as transverse links.

According to still another development of the cover of the invention, it is proposed that this have at least two sections and at least one fastening region between two sections, designed to be joined to a chain link. In such a design of the cover according to the invention, the possibility is created that the cover extends through several chain links. As a result of this, the expenditure for assembly is reduced. The fastening region can be designed here so that it is suitable for positive and/or nonpositive locking with a transverse link of the chain link. This fastening region itself can be designed as a transverse link. There are also other possibilities; especially this fastening region can be designed so that it is connected to at least one projection on a chain link.

The cover according to the invention can be made from different materials. Especially, it is proposed that the cover be made of a plastic, at least partly. The cover can be made in this case as an extruded part. The wide cover can be produced in the case of an extruded part by corresponding bending according to requirements. Instead of a plastic, the cover can also be made of a metal. In order to produce the cover, a sheet can be provided, for example, with the wavy design of the section, by cold forming.

If the cover is made of a plastic, then it is proposed that the section be made of at least two plastics which have different elasticities. Here, the wave crests and wave troughs can be made of a plastic with a higher elasticity than the flanks. Moreover, the cover can be designed so that the end regions or the fastening region is made from a different plastic than the section of the cover.

Another goal is to provide a chain link for an energy guide chain in which covering of the chain link is possible with simple means.

The chain link of an energy guide chain according to the invention has two mounting links and at least one transverse link connected to the mounting link. The mounting links can be formed as individual parts. They can also be segments of two strands arranged in parallel, as they are known from WO 00/13277.

The chain link has at least one cover, where the cover has a first end region and a second end region and is provided with at least one elastic section between the first end region and the second end region. The elastic section is designed so that the following relationship applies:

$$\Delta L/S < 1.$$

Here, $\Delta L$ represents the length change of the cover having a length $L_0$ in Hooke's law, while S is the actual length change of the cover.

A simple construction is achieved by the chain link according to the invention. Moreover, the possibility is open to use the chain link with a cover, which ensures that no the parts penetrate into the guide channel formed by the chain link.

The cover of the chain link according to the invention is preferably provided with at least one transverse link, especially a separable one. In order to open the chain link, according to a still further advantageous embodiment of the chain link, it is proposed that the transverse link be joined pivotably to at least one mounting link.

According to a still further advantageous embodiment of the chain link according to the invention, it is proposed that the chain link have at least one fastening element which is joined to a cover. The fastening element can be designed in the direction of the opposing mounting link in such a way that the cover is arranged between the mounting links of the link chain. This is not absolutely necessary. There is also the possibility for the cover to lie at the edge of the chain link.

Moreover, the chain link has additional advantages and possibilities of application. The possibility exists to provide the chain link with two covers, so that a two-sided cover of the chain link is made possible.

A still further goal of the invention is to provide an energy guide chain in which a cover is present that can be produced and mounted simply.

Advantageous further developments and embodiments of the energy guide chain are the objects of the dependent Claims.

The energy guide chain according to the invention has a multiplicity of chain links which are linked together. At least some of the chain links have at least one cover. The cover has a first end region and a second end region and at least one elastic section between the first end region and the second end region. The elastic section is designed here so that the following relationship applies to it:

$\Delta L/S < 1$.

Through the energy guide chain according to the invention, a completely new path is struck in the design of energy guide chains with covers. In contrast to energy guide chains as they are known from EP 0 286 442 A1, in the case of the energy guide chain according to the invention, no cover is produced which consists of several cover parts which overlap and permit movement, so that the overlapping region changes as a function of the movement. Instead of this, an energy guide chain is provided in which the cover is designed so that it undergoes a length change, especially in the area of curving of the energy guide chain, this length change being greater than a length change which is produced only by elasticity.

The energy guide chain according to the invention has a first end region and/or a second end region which are connected with a transverse link. Here, the cover can extend from one transverse link of a chain link to the neighboring trans-verse link of a neighboring chain link. However, there is the possibility that the cover extends over at least two chain links partially. Especially, it is proposed that, in a cover which extends over several chain links, fastening elements be provided which are formed on the chain links, which are intended for fastening at least one cover.

The energy guide chain can also have two covers, where an upper and a lower cover are provided. These covers can be designed to be the same. This is not absolutely necessary. There is also the possibility that the upper cover, that is, the cover, which is up in the upper trunk, is designed so that it has a certain prestressing. As a result of this prestressing, the cover can act as damping element. As a result of the prestressing of the cover, there is also the possibility to introduce a prestressing into the energy guide chain.

Other advantages and details of the invention are explained with the practical examples shown in the drawing, without the object of the invention being limited to these concrete practical examples.

BRIEF DESCRIPTION OF THE DRAWINGS

The following are shown.

DETAILED DESCRIPTION OF THE PREFERRED EMBODIMENTS

Figure 1:
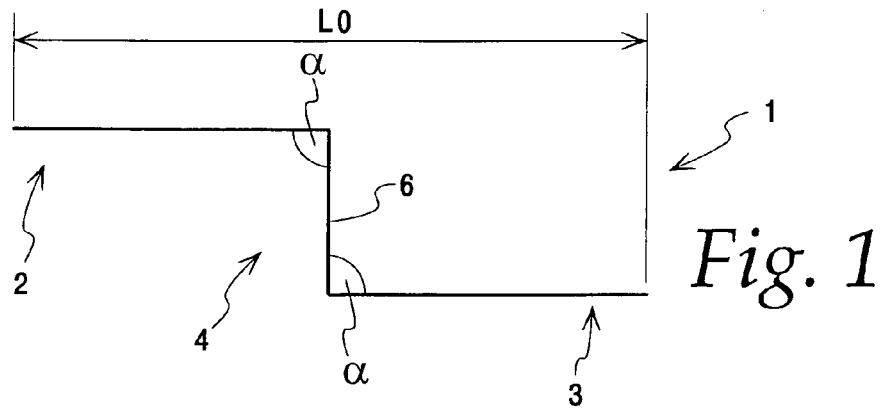
FIG. 1 is a schematic representation of a first practical example of a cover.

FIG. 1 shows schematically a first embodiment of a cover 1 for an energy guide chain. The cover 1 has a first end region 2 and a second end region 3. An elastic section 4 is provided between the first end region 2 and the second end region 3. The elastic section 4 is designed so that the relationship $\Delta L/S<1$ applies to it. This relationship will be explained further later on with the aid of the representations shown in FIGS. 2, 3 and 4.

Cover 1 shows a certain cross-sectional geometry. It has the length $L_0$. Furthermore, the cover is made of a material with a known modulus of elasticity.

Figure 2:
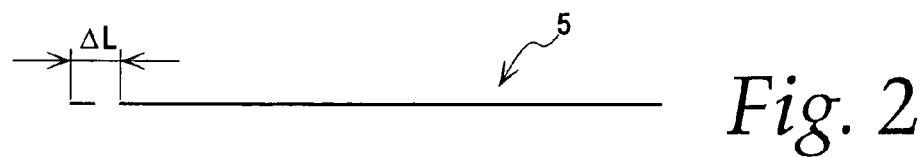
FIG. 2 is a schematic representation of a replacement cover.

FIG. 2 shows a replacement part for cover 1. The replacement part has a flat design. It has the same cross-sectional geometry as cover 1. Furthermore, the replacement part 5 has the same physical properties as cover 1. It has the same modulus of elasticity as cover 1.

If this replacement part 5, which has the same length $L_0$ as the cover, is subjected to a tensional force, then the replacement part undergoes a length change $\Delta L$ which follows Hooke's law. Here, it is assumed that the normal stress in replacement part 5 lies in the proportionality region of the stress-elongation curve. The tensional force to which the replacement part is subjected has the same size and the same direction as it would occur or occurs on the cover during the operation of an energy guide chain.

Figure 3:
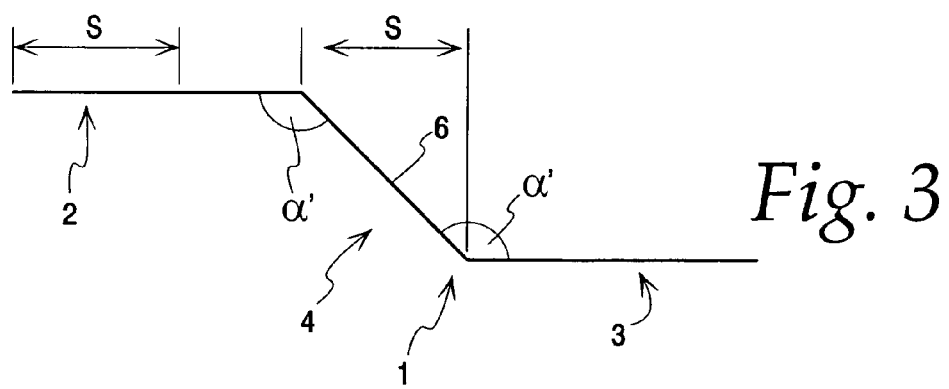
FIG. 3 shows the cover according to FIG. 1, in the extended state.

FIG. 3 shows schematically the cover 1 in the deformed state. The deformation of cover 1 is based on the tensional force acting on cover 1. As a result of the action of the tensional force, the cover undergoes a length change S. As a result of the constructional structure of section 4, the ratio of the length change $\Delta L$ of the replacement part to the actual length change S of the cover 1 is smaller than 1.

The actual length change S can be achieved merely by changing the shape or form of section 4. Moreover, the actual length change S may consist of a part which can be attributed to the shape change of section 4 as well as to the elongation of the cover or of the section.

In the practical example shown, the cover essentially has a Z-shape. The cover 4 has a flank 6, which forms an angle $\alpha$ with the particular neighboring regions of cover 1. It is not absolutely necessary for the angles $\alpha$ to be the same.

Different angles α can be provided. In the practical example shown, the angles α are the same and are approximately 90°. As a result of application of a tensional force on cover 1, a change occurs in section 4, as a result of which the angle α in the resting state changes to an angle α' in the stressed state, where α' is greater than the angle α in the resting state.

If cover 1, as shown in FIG. 1, is used in an energy guide chain, then expansion of cover 1 occurs in the transition region, which is between an upper trunk and a lower trunk of the energy guide chain. It should be pointed out here that a transition region or a curvature region of the energy guide chain also occurs when the energy guide chain is lying down or is in a hanging arrangement, but then we cannot speak of an upper trunk and a lower trunk in the sense of a direction.

Figure 4:
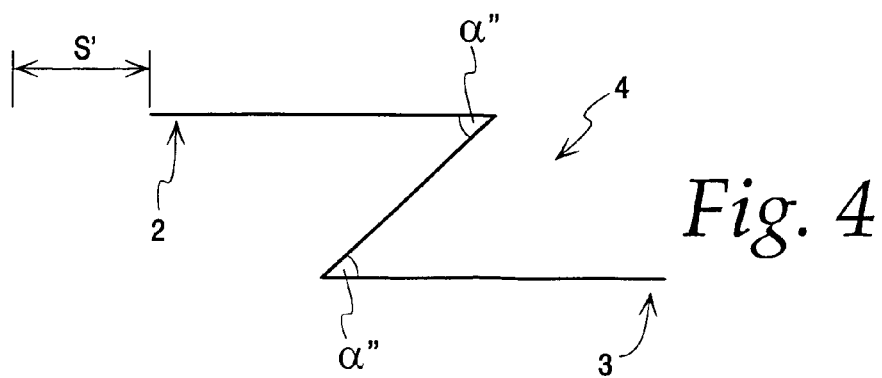
FIG. 4 shows the cover according to FIG. 1, in the banked-up state.

There is also the possibility of introducing the cover 1 into the energy guide chain in the prestressed state. FIG. 4 shows the cover 1 in the prestressed state. In this state, compressive forces act on cover 1, as a result of which cover 1 suffers a shortening by S'. This actual length change, due to the compressive force, is greater than the lengthening ΔL when a compressive force would be acting on replacement part 5. In the transition region or in the curvature region of an energy guide chain, cover 1 undergoes decompression since, in the transition region, the compressive forces are removed from the cover.

Figure 5:
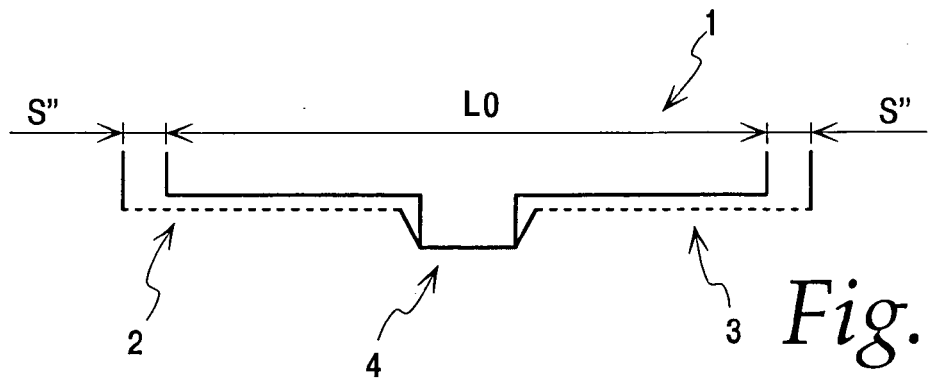
FIG. 5 shows schematically a second practical example of a cover.

FIG. 5 shows a second practical example of a cover 1. Cover 1 has a first end region 2 and a second end region 3. An elastic section 4 is formed between the first end region 2 and the second end region 3. The elastic section 4 has a U-shape in the practical example shown. This design of the elastic section 4 is representative of possible forms, where, for example, we can deal with forms that are curved, especially those that form parts of a circle. Section 4 can also be in the form of an open polygonal outline.

In FIG. 5, cover 1 is shown with a dashed line when tensional forces act on both end regions of cover 1. The tensional forces produce a deformation of section 4, which results in length changes S''. The sum of the length change S'' gives the actual length change S. The length changes S'' can be the same or different. Different lengths changes S'' can arise from the fact that at least the section 4 is made asymmetric. This can be achieved, for example, by using different materials. A change in the expansion behavior can also be caused by at least section 4 having different cross-sections.

Figure 6:
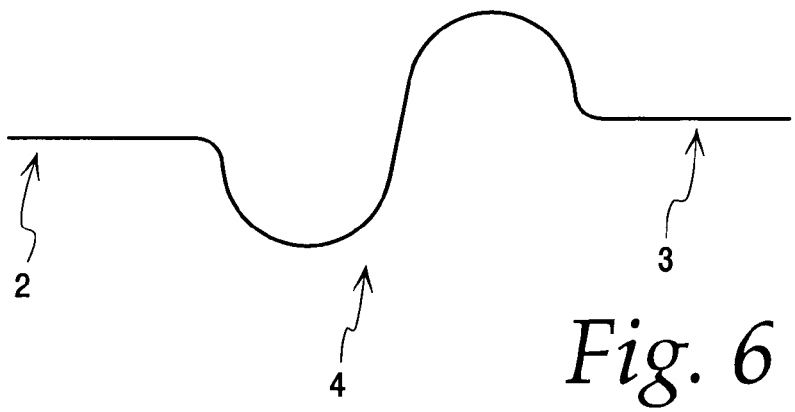
FIG. 6 is a third practical example of a cover.

FIG. 6 shows a third practical example of a cover 1. The cover 1 has a first end region 2 and a second end region 3. A section 4 is provided between the first end region 2 and the second end region 3. This section 4 is in the shape of a wave. Here, we are dealing with a symmetrical wave, but this is not absolutely necessary.

Figure 7:
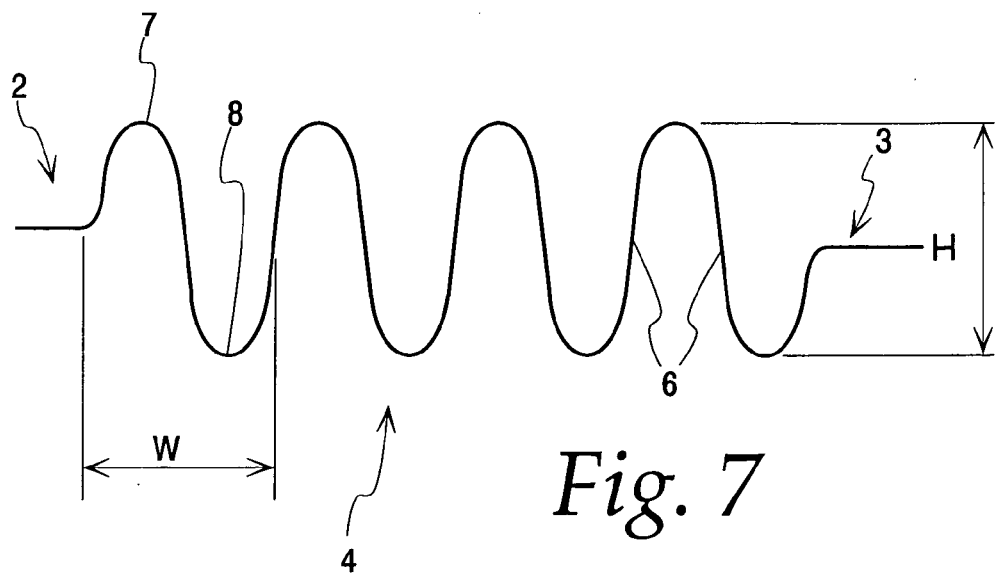
FIG. 7 is a practical example of a cover with a wavy section.

FIG. 7 shows yet another variation of a cover 1. The cover 1 has a section 4 which has a wavy shape. The waves are essentially sinusoidal waves. Section 4 has waves which have the same height H. This is not absolutely necessary. It is also possible for individual waves or half waves to have different heights. There is also the possibility to design the wave lengths W different. Furthermore, the flanks 6 of the waves of section 4 can have different slopes. The curvature of the wave crests 7 or of the wave troughs 8 can be different.

Figure 8:
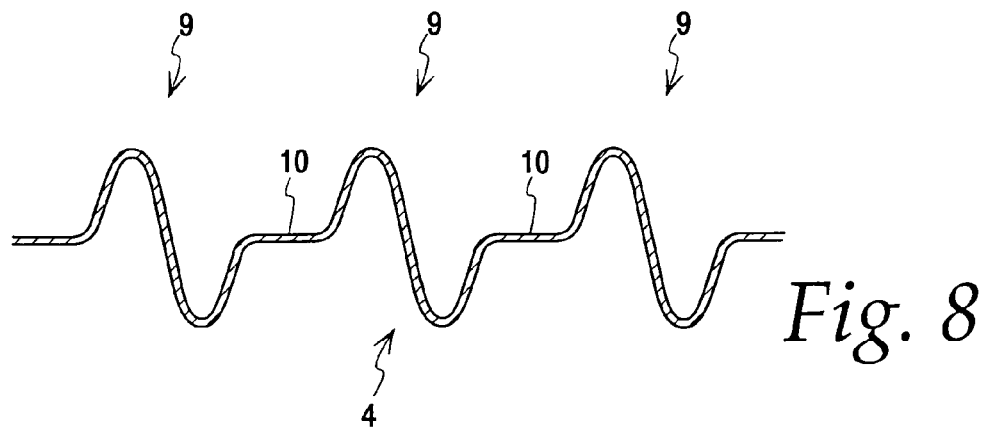
FIG. 8 is a cover with a wavy section.

FIG. 8 shows a design of a section 4 which is formed essentially in a wavy shape. It has waves 9, which are formed between regions 10, which are essentially flat. Regions 10 can be such regions with increased elasticity. The regions 10 can also be designed as fastening regions, which are intended for linking with a chain link. It is not absolutely necessary that the fastening regions extend over the entire width of the cover.

Figure 9:
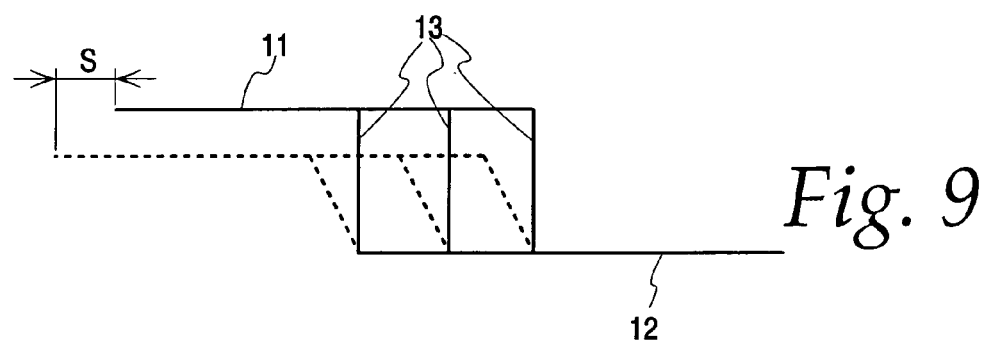
FIG. 9 shows schematically a fourth practical example of a cover.

FIG. 9 shows still another embodiment of a cover. The cover has two cover parts 11, 12, which partially overlap. Plates 13 are provided in the overlap region of cover parts 11, 12. The plates 13 extend essentially transversely to the longitudinal direction of the cover. Here, the plates 13 can extend over the entire width of the cover, but this is not absolutely necessary. There is also the possibility that the plates 13 extend only over a part of the width of the cover.

If a tensional force is introduced into cover 1, then plates 13 will undergo an excursion. The extent of the excursion depends on the size of the tensional force. Cover 1 is represented by a dashed line for the case when a tensional force is applied to cover 1.

Figure 10:
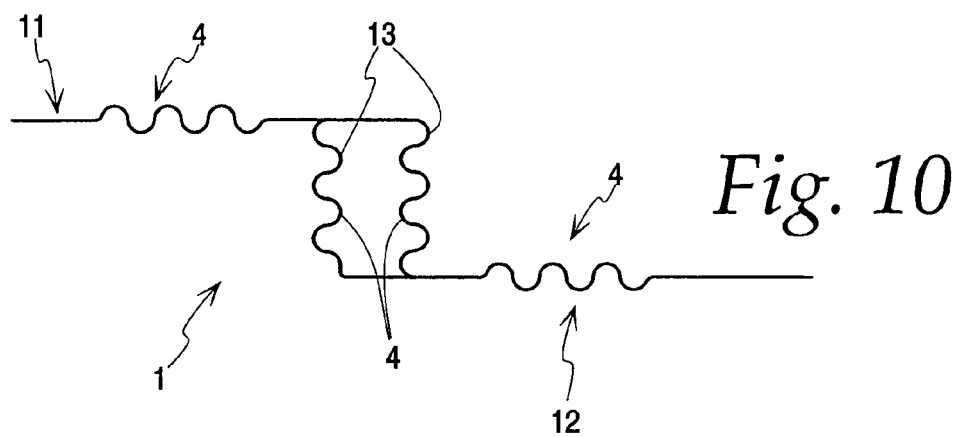
FIG. 10 shows schematically a fifth practical example of a cover.

The extent of the length change S can be further altered by a modification of cover 1. Such a modification of cover 1 is shown in FIG. 10. The principle of the structure of cover 1 according to FIG. 10 corresponds to that of the cover according to FIG. 9.

Cover 1 according to FIG. 10 also has two cover parts 11, 12. Both cover part 11 as well as cover part 12 have a section 4 which has a wavy shape.

The plates 13, which join cover parts 11, 12, have a wavy form at least partly so that this wavy design of plates 13 represents a section in the sense of the invention. Upon introduction of a tensional force or compressive force into cover 1, compression or elongation of section 4 occurs. Hereby, the individual sections 4 can be designed so that, for example, upon the action of a force, first the sections 4 of plates 13 are activated before the sections 4 of the cover parts 11, 12 are elongated or compressed, depending on whether a tensional force or a compression force is applied onto cover 1.

Figure 11:
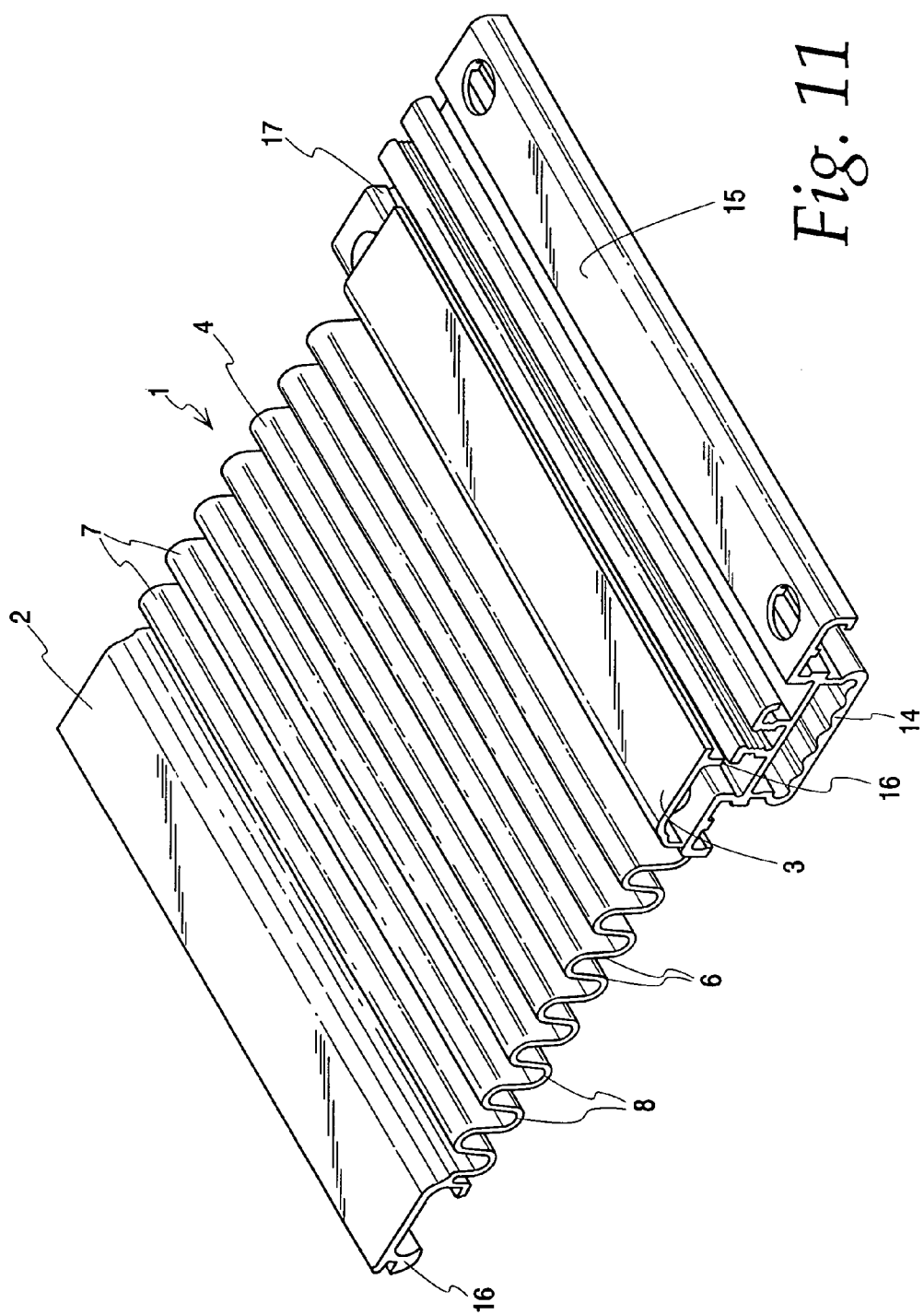
FIG. 11 shows a perspective view of a cover with a tie bar.

A cover 1 in combination with a transverse link 14 is shown in FIG. 11. Cover 1 has a wavy section 4. The wave crest 7 and wave trough 8 have a smaller thickness than flanks 6 (not shown for the sake of clarity) so that spreading in the longitudinal direction of the cover 1 is simplified.

Cover 1 has a first end region 2 and a second end region 3. In the practical examples shown, end regions 2, 3 are designed to be identical. This is not absolutely necessary.

End regions 2 and 3 have essentially a C-shape.

The transverse link 14 has a holding region 15, which is designed so that it cooperates with the first or with the second end region. Here, the essentially C-shaped region of the cover engages in holding region 15. A wall 16 of end region 2, 3 engages in a groove 17 of transverse link 14. The inside width of the C-shaped end region 2, 3 is somewhat smaller than the width of holding region 15, so that, in the mounted state, a positive and nonpositive linking between the trans-verse link 14 and cover 1 can be produced. The transverse link 14 has holding regions 15 on both sides of its longitudinal edges, so that a first end region of a cover and a second end region 3 of a cover can be linked with a transverse link.

Figure 12:
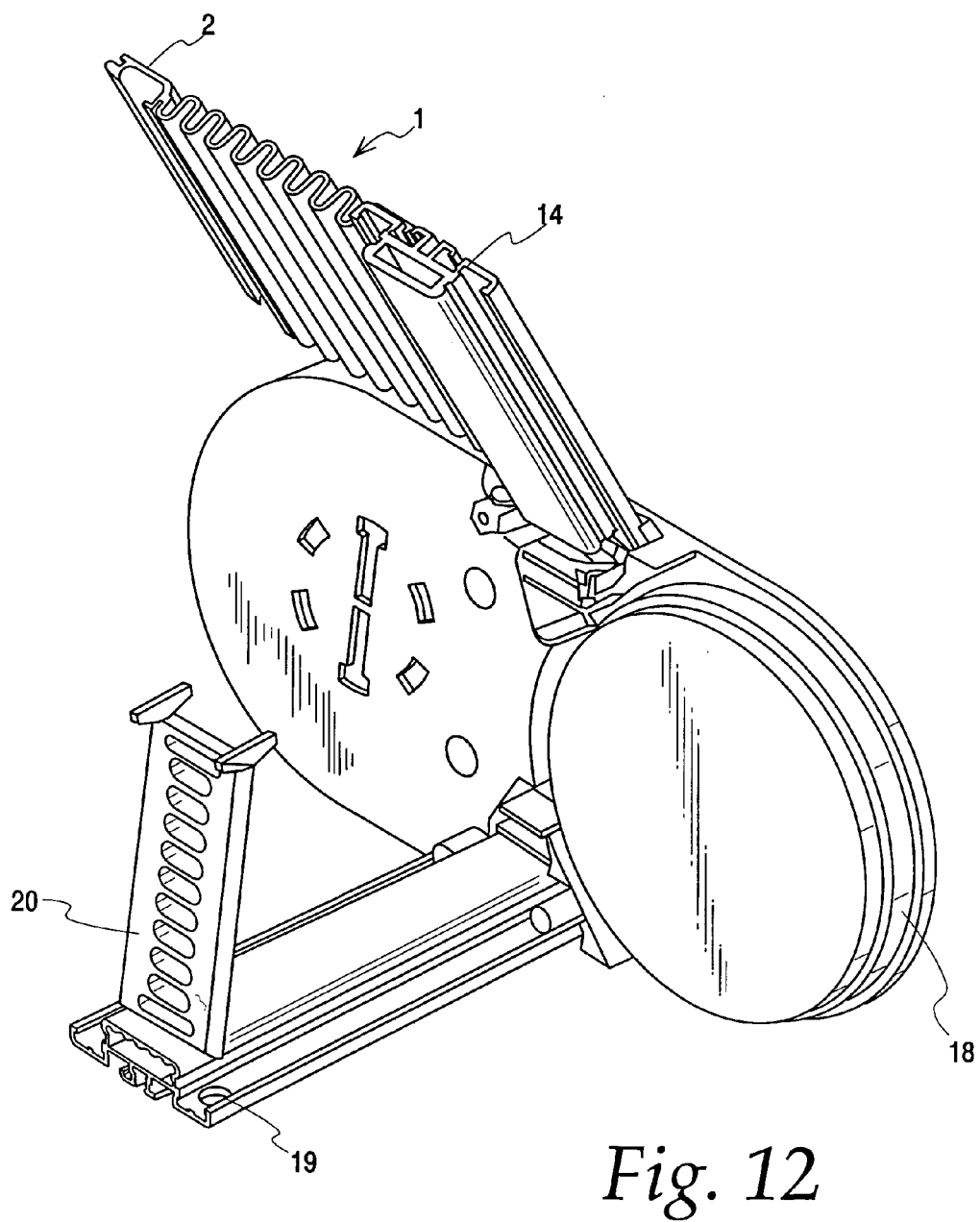
FIG. 12 shows a chain link schematically and partially.

FIG. 12 shows a part of a chain link of an energy guide chain. The representation shows a mounting link 18. Two transverse links 14, 19 are joined with mounting link 18. For better clarity, a second mounting link in FIG. 12 is not shown.

A cover 1 is linked to transverse link 14. It has a first end region 2 and a second end region 3. End region 3 is linked to transverse link 14. The design of cover 1 and transverse link 14 corresponds to the design of the transverse link and cover shown in FIG. 11 and therefore reference is made to the description of that figure.

A separating link 20 is joined to transverse link 19. It can also be linked to transverse link 14. Transverse link 14 can be pivoted around an axis lying in the longitudinal direction of the chain link.

Several separating links 20 can be provided in the chain link. In addition, separating links can be present, which are links separating the space delineated by the mounting links as well as the transverse links in an essentially horizontal direction.

Figure 13:
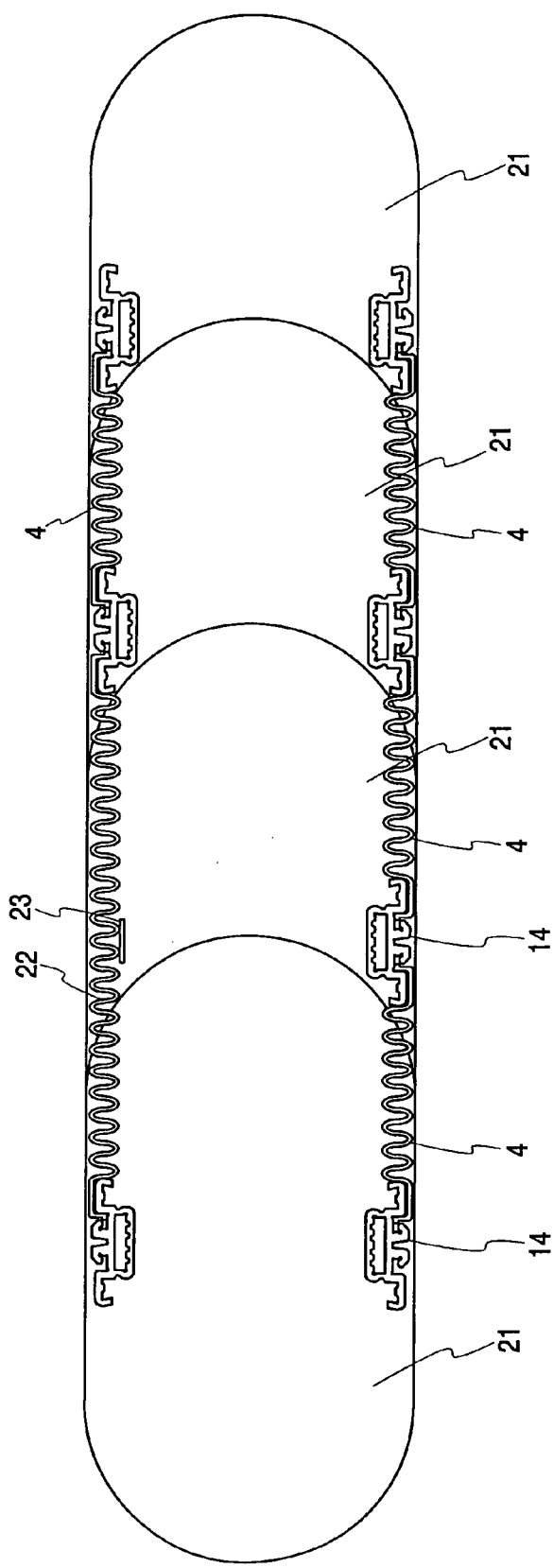
FIG. 13 shows schematically a part of the energy guide chain.

FIG. 13 shows a section of an energy guide chain. The energy guide chain is formed by chain links 21 linked together through several links. The energy guide chain has covers 4 which cover the upper side of the energy guide chain, as well as the bottom side of the energy guide chain. Here, a cover extends from one transverse link 14 of chain link 21 to the neighboring transverse link 14 of a chain link 21. This is not absolutely necessary. The cover 4 can also extend over several chain links. In the practical example shown, cover 22 extends over three chain links. A fastening element 23 is formed on the middle chain link and that is connected with cover 4. The purpose of the fastening element 23 is to ensure that, in the curving region, cover 4 does not penetrate into the channel of the energy guide chain. The fastening element 23 can be designed in the form of protrusions or cams. For example, this can engage into a wave where the wave lies on the fastening element.

Figure 14:
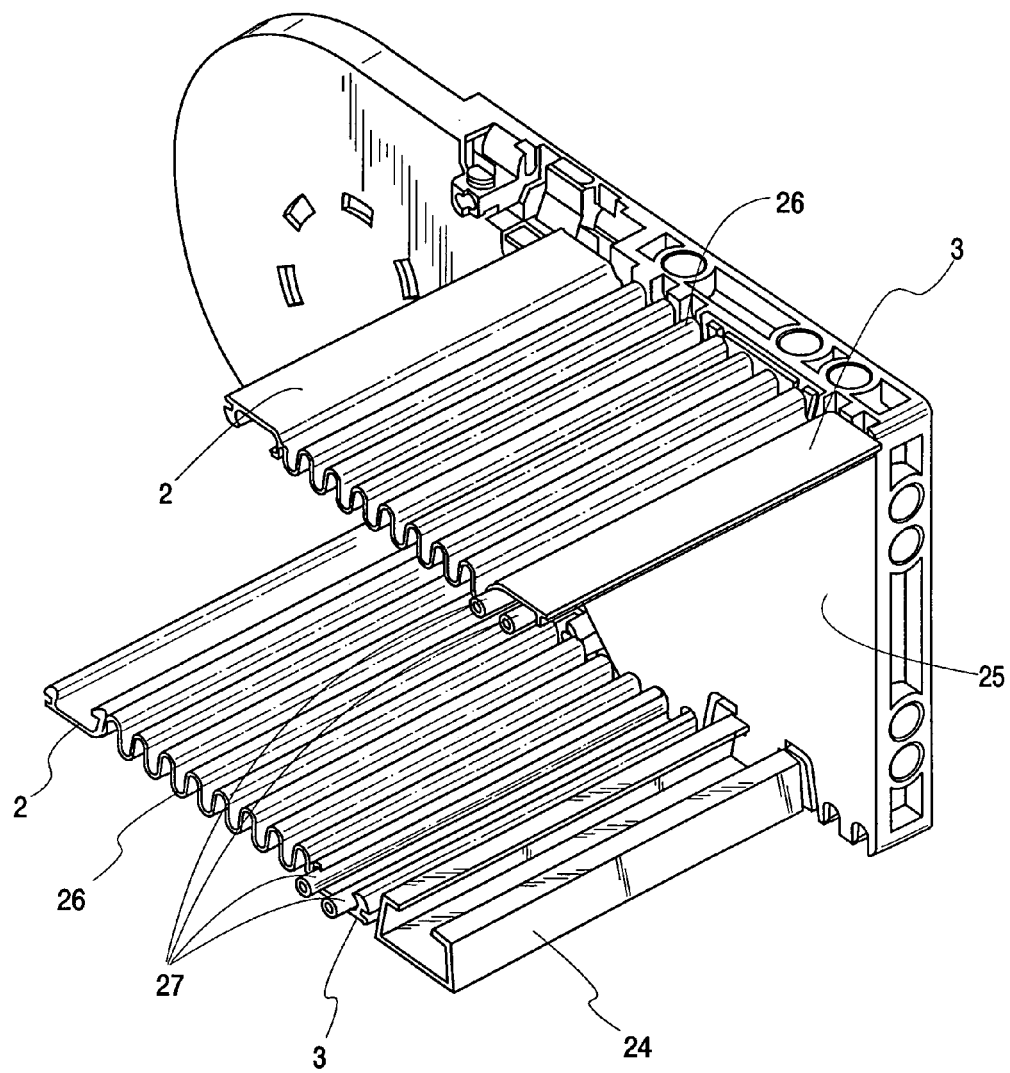
FIG. 14 shows a part of a chain end link.

An energy guide chain has end links which are connected to a fixed or movable connection. FIG. 14 shows a chain end section partially. It has C-shaped profile tracks 24, which are connected to the mounting links 25 of the chain link. The C-shaped tracks serve to hold a tension release means, which is not shown. To cover the chain end link, in the embodiment shown, two covers 26 are provided. The covers 26 are preferably designed corresponding to the other covers of an energy guide chain. They each have a first end region 2 as well as a second end region 3. The end regions 2 of the covers 26 are designed so that they can be joined with the transverse link of the end sections not shown.

The second end region 3 is connected to fastening means 27. The fastening means 27 are rods in the embodiment shown here and these have an essentially cylindrical shape. These fastening means 27 are joined to plates 25. The joint can be by positive or nonpositive locking.

Figure 15:
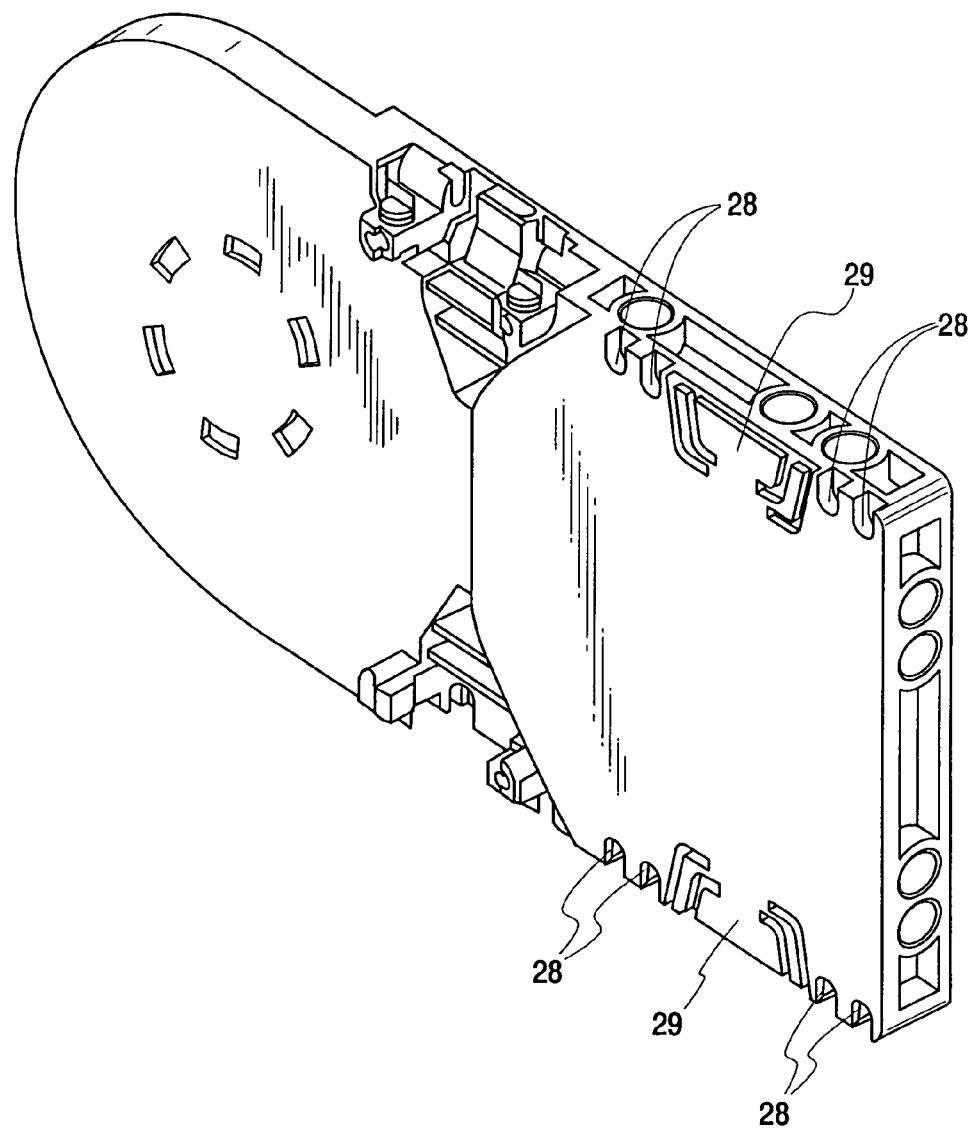
FIG. 15 is a mounting link of a chain end link.

In the embodiment shown, the mounting links 25 have recesses 28. The recesses 28 extend from the longitudinal edges transversely to these, in the direction of the opposing longitudinal edge. The contours of the recesses 28 are adapted to the outside contours of the fastening means 27. FIG. 15 shows recesses 28 which are designed on both sides with a receptacle 29. Receptacle 29 serves for establishing the C-shaped tracks 24.

The invention claimed is:

1. A cover for an energy guide chain, wherein the cover comprises:
    a first end region;
    a second end region; and
    an elastic section between the first end region and the second end region; wherein the cover has an initial length and a second length when subjected to tension to define an actual length change S, and wherein the following ratio applies:

$$\Delta L/S < 1$$

where $\Delta L$ is a length change of the cover with a length $L_0$ due to a force according to Hooke's law, and S is the actual length change of the cover due to the force.

2. The cover according to claim 1, wherein the elastic section has a wavy shape.

3. The cover according to claim 2, wherein the elastic section has waves of different heights.

4. The cover according to claim 2, wherein the elastic section has waves of different periods.

5. The cover according to claim 2, wherein elastic section wavy shape comprises a first wave and a second wave, each wave having flanks of a different slope than the other wave.

6. The cover according to claim 2, wherein the wavy shape defines a first wave and a second wave, each wave comprising a wave trough and a wave crest, and a curvature of the wave trough and wave crest of the first wave is different than the curvature of the wave trough and wave crest of the second wave.

7. The cover according to claim 5, wherein each wave further comprises a wave crest, and the first wave crest has a different cross-section than the flank of the first wave.

8. The cover according to claim 7, wherein the first wave crest has a thickness that is less than the thickness of the flank of the first wave.

9. The cover according to claim 2, wherein the wavy section further comprises:
    a localized reinforcing microstructure.

10. The cover according to claim 2, wherein the elastic section has a first region and a second region, and wherein a structure of the first region is different than the structure of the second region.

11. The cover according to claim 1, and further comprising:
    a first cover part;
    a second cover part partially overlapping the first cover part; and
    a transverse plate linked to the first and second cover parts.

12. The cover according to claim 11, wherein the plate is made at least partially of an elastic material.

13. The cover according to claim 11, wherein a portion of the plate has a wavy shape.

14. The cover according to claim 1, wherein the first end region comprises a lock for engagement with a transverse link of a chain link.

15. The cover according to claim 1, wherein the first end region is a transverse link in a chain.

16. The cover according to claim 1, and further comprising:
    a plurality of cover sections and a fastening region formed between two cover sections for linking the cover to a chain link.

17. The cover according to claim 1, wherein the cover is made at least partially of plastic.

18. The cover according to claim 1, wherein the cover is made of at least two plastics with different elasticities.

19. A chain link of an energy guide chain comprising:
    two mounting links;
    a transverse link joining the mounting links;
    and a cover comprising:
    a first end region and a second end region and an elastic section disposed between the first end region and the second end region, and wherein the cover satisfies the following relationship when a force is applied to the cover:

$$\Delta L/S < 1$$

where $\Delta L$ is the length change of the cover with a length $L_0$ according to Hooke's law, and S is the actual length change of the cover when force is applied to the cover.

20. The chain link according to claim 19, wherein the cover is separably joined to the transverse link.

21. The chain link according to claim 20, wherein the transverse link is joined pivotably to a mounting link.

22. The chain link according to claim 19, and further comprising:
a fastening element joined to the cover.

23. The chain link according to claim 19, and further comprising a second traverse link, and wherein the cover extends between the transverse links.

24. The energy guide chain according to claim 23, and wherein the cover is connected to the traverse link.

25. An energy guide chain comprising:
a plurality of chain links;
a joint linking adjacent chain links; and
a cover joined to at least one chain link;
wherein the cover comprises:
a first end region;
a second end region; and
an elastic section disposed between the first end region and second end region, such that the following relationship applies to the cover:

$$\Delta L/S < 1$$

where $\Delta L$ is the length change of the cover with a length $L_0$ according to Hooke's law, and S is the actual length change of the cover when force is applied to the cover.

26. The energy guide chain according to claim 25, wherein the cover extends over at least two chain links.

27. The energy guide chain according to claim 25, and further comprising:
a traverse link; and
wherein the first end region is separably connected with the transverse link.

28. The energy guide chain according to claim 25, and further comprising:
cover fastening elements joined to a chain link.

29. The energy guide chain according to claim 25, wherein the cover is joined to two neighboring chain links.

30. The energy guide chain according to claim 27, and further comprising a second traverse link, and wherein the cover extends between the transverse links.

31. The energy guide chain according to claim 30, and wherein the cover is connected to the traverse link.

* * * * *